(12) United States Patent
Bronder et al.

(10) Patent No.: US 11,640,812 B2
(45) Date of Patent: May 2, 2023

(54) VISUAL CONTENT OVERLAY SYSTEM

(71) Applicant: Apple Inc., Cupertino, CA (US)

(72) Inventors: Kjell F. Bronder, San Francisco, CA (US); Scott M. Herz, San Jose, CA (US); Karlin Y. Bark, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/315,159

(22) Filed: May 7, 2021

(65) Prior Publication Data

US 2021/0264881 A1 Aug. 26, 2021

Related U.S. Application Data

(62) Division of application No. 15/762,543, filed as application No. PCT/US2016/053182 on Sep. 22, 2016, now Pat. No. 11,004,426.

(Continued)

(51) Int. Cl.
*G09G 5/38* (2006.01)
*B60K 35/00* (2006.01)
(Continued)

(52) U.S. Cl.
CPC ............... *G09G 5/38* (2013.01); *B60K 35/00* (2013.01); *G01C 21/365* (2013.01);
(Continued)

(58) Field of Classification Search
CPC .... G09G 5/38; G09G 5/373; G09G 2340/045; G09G 2340/0464; G09G 2380/10;
(Continued)

(56) References Cited

U.S. PATENT DOCUMENTS 8,577,601 B2 11/2013 Li et al.
2007/0101290 A1 5/2007 Nakashima et al.
(Continued)

FOREIGN PATENT DOCUMENTS

CN 101844548 A 9/2010
CN 101876750 11/2010
(Continued)

OTHER PUBLICATIONS

Extended European Search Report from European Application No. 202003745.5-1203, dated May 31, 2021, pp. 1-11.
(Continued)

*Primary Examiner* — Jeffery A Brier
(74) *Attorney, Agent, or Firm* — Robert C. Kowert; Kowert, Hood, Munyon, Rankin & Goetzel, P.C.

(57) ABSTRACT

An augmented reality display system included in a vehicle generates an augmented reality display, on one or more transparent surfaces of the vehicle. The augmented reality display can include an indicator of the vehicle speed which is spatially positioned according to the speed of the vehicle relative to the local speed limit. The augmented reality display can include display elements which conform to environmental objects and can obscure and replace content displayed on the objects. The augmented reality display can include display elements which indicate a position of environmental objects which are obscured from direct perception through the transparent surface. The augmented reality display can include display elements which simulate one or more particular environmental objects in the environment, based on monitoring manual driving performance of the vehicle by a driver. The augmented reality display can include display elements which identify environmental objects and particular zones in the environment.

21 Claims, 10 Drawing Sheets

Related U.S. Application Data

(60) Provisional application No. 62/232,855, filed on Sep. 25, 2015.

(51) Int. Cl.
  *G01C 21/36* (2006.01)
  *G02B 27/01* (2006.01)
  *G09G 5/373* (2006.01)

(52) U.S. Cl.
  CPC ......... *G02B 27/0101* (2013.01); *G09G 5/373* (2013.01); *B60K 2370/152* (2019.05); *B60K 2370/166* (2019.05); *B60K 2370/167* (2019.05); *B60K 2370/177* (2019.05); *G02B 2027/0127* (2013.01); *G02B 2027/0141* (2013.01); *G09G 2340/045* (2013.01); *G09G 2340/0464* (2013.01); *G09G 2380/10* (2013.01)

(58) Field of Classification Search
  CPC .............. B60K 35/00; B60K 2370/152; B60K 2370/166; B60K 2370/167; B60K 2370/1529; B60K 2370/168; G02B 27/0101; G02B 2027/0127; G02B 2027/0141; G01C 21/365; G08G 1/09623; G08G 1/09626; G08G 1/166
  See application file for complete search history.

(56) References Cited

U.S. PATENT DOCUMENTS

| | | | |
|---|---|---|---|
| 2008/0239078 A1 | 10/2008 | Mohr et al. | |
| 2009/0195414 A1 | 8/2009 | Riegel et al. | |
| 2010/0253602 A1 | 10/2010 | Szczerba et al. | |
| 2011/0128139 A1 | 6/2011 | Tauchi et al. | |
| 2012/0059720 A1 | 3/2012 | Musabji et al. | |
| 2012/0154441 A1 | 6/2012 | Kim | |
| 2013/0083061 A1 | 4/2013 | Mishra et al. | |
| 2013/0162639 A1 | 6/2013 | Muench et al. | |
| 2013/0293582 A1 | 11/2013 | Ng-Thow-Hing et al. | |
| 2014/0019005 A1 | 1/2014 | Lee et al. | |
| 2014/0309982 A1* | 10/2014 | Ricci | G06F 3/04886 704/3 |
| 2014/0354684 A1 | 12/2014 | Beckwith et al. | |
| 2014/0372020 A1 | 12/2014 | Stein | |
| 2015/0022426 A1 | 1/2015 | Ng-Thow-Hing et al. | |
| 2015/0057831 A1 | 2/2015 | Finlow-Bates | |
| 2015/0062168 A1 | 3/2015 | Ng-Throw-Hing et al. | |
| 2015/0206432 A1 | 7/2015 | Kuehne | |
| 2015/0245017 A1 | 8/2015 | Di Censo et al. | |
| 2015/0293355 A1 | 10/2015 | Pouliquen et al. | |

FOREIGN PATENT DOCUMENTS

| | | | |
|---|---|---|---|
| CN | 102542823 | 7/2012 | |
| CN | 102542831 | 7/2012 | |
| CN | 102568226 | 7/2012 | |
| CN | 102975669 A | 3/2013 | |
| CN | 103337184 | 10/2013 | |
| CN | 103593993 | 2/2014 | |
| CN | 103606268 | 2/2014 | |
| CN | 104515531 | 4/2015 | |
| CN | 104768130 A | 7/2015 | |
| CN | 104781722 | 7/2015 | |
| CN | 104883554 | 9/2015 | |
| CN | 104512336 | 3/2019 | |
| DE | 10-2013007974 | 10/2014 | |
| EP | 1995116 | 11/2008 | |
| EP | 2608153 | 6/2013 | |
| JP | H09178506 | 7/1997 | |
| WO | 2015037325 | 3/2015 | |
| WO | WO-2015077766 A1 * | 5/2015 | ......... G01C 21/3602 |
| WO | 2016092825 | 6/2016 | |

OTHER PUBLICATIONS

Office Action dated Jul. 16, 2021 in Chinese Patent Application No. 201680055195.7, Apple Inc. (pp. 1-19 including translation).
Office action from Chinese Application No. 201680055195.7, dated Mar. 31, 2020, (English Translation and Chinese Version), pp. 1-31.
International Preliminary Report from PCT/US2016/053182, dated Sep. 25, 2015, Apple Inc., pp. 1-11.
Kristen Hall-Geisler, "Augmented Reality is Coming to Your Windshield", Popular Science, POPSCI.COM/BLOGS, Posted May 14, 2015, pp. 1-9.
Office action from Chinese Patent Application No. 201680055195.7, dated Jan. 18, 2021, pp. 1-33.

* cited by examiner

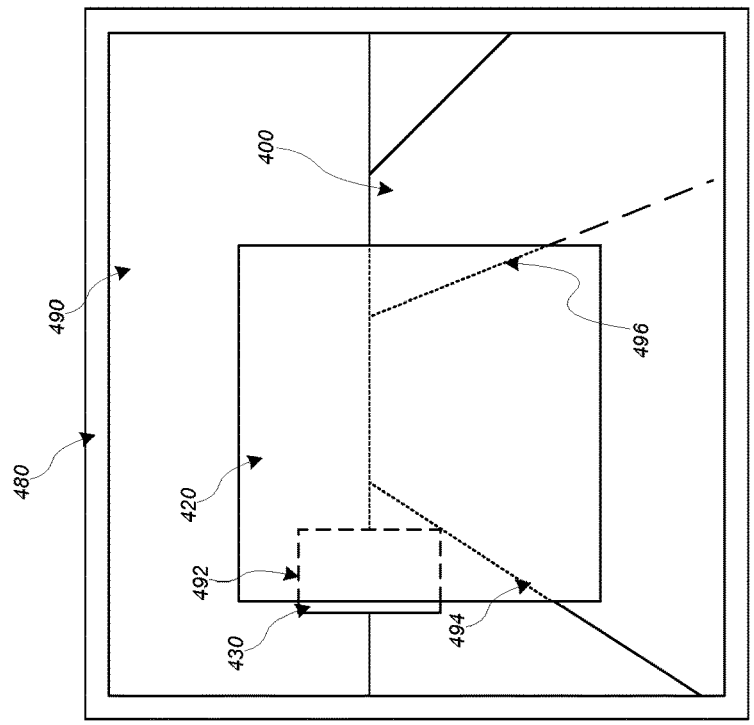
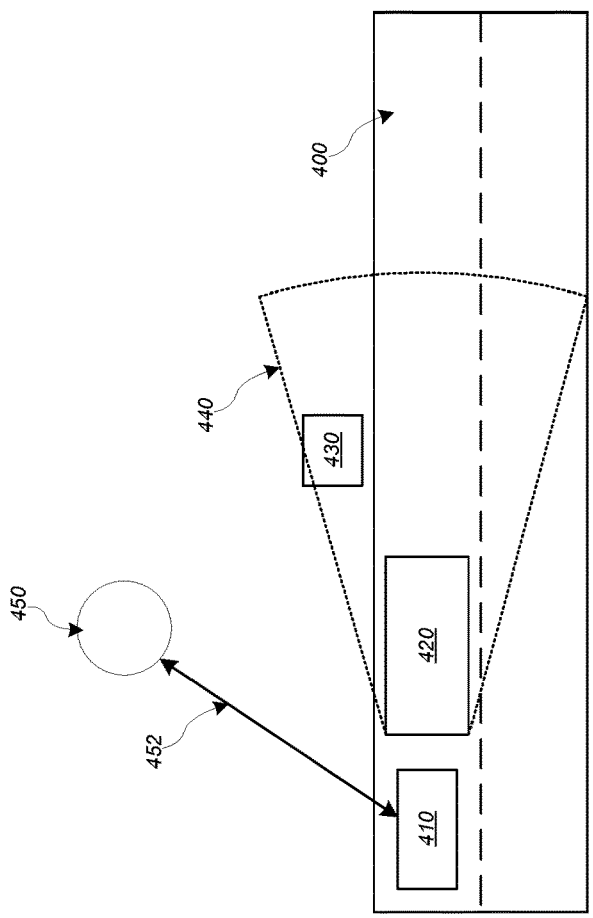
FIG. 4B
FIG. 4A

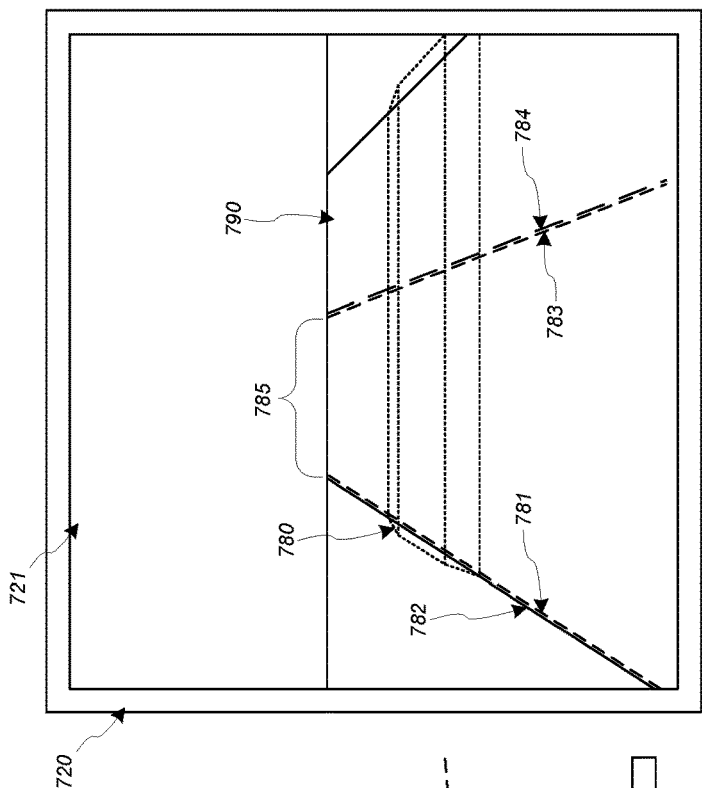
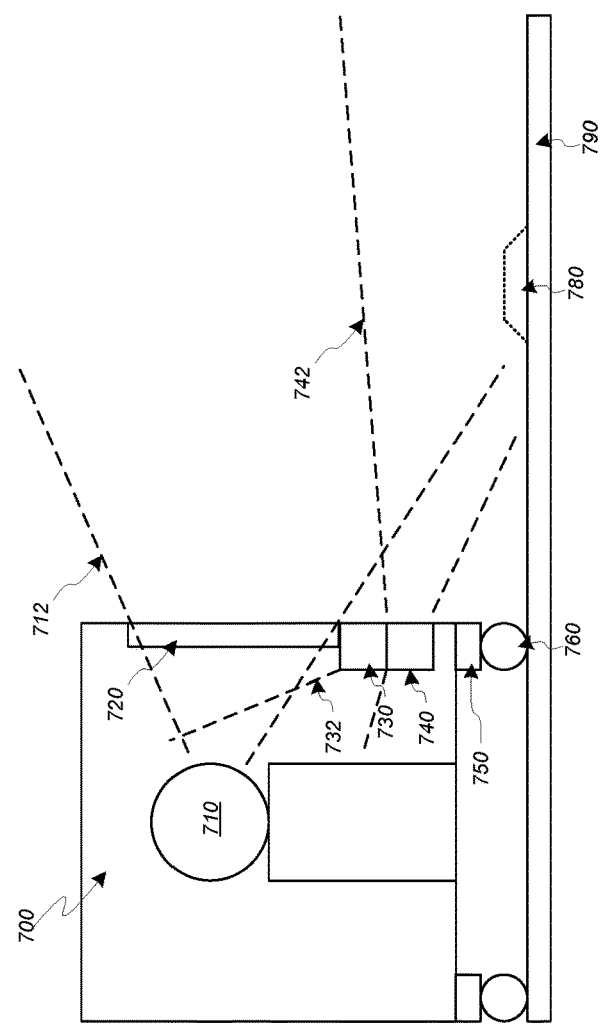
FIG. 7B
FIG. 7A

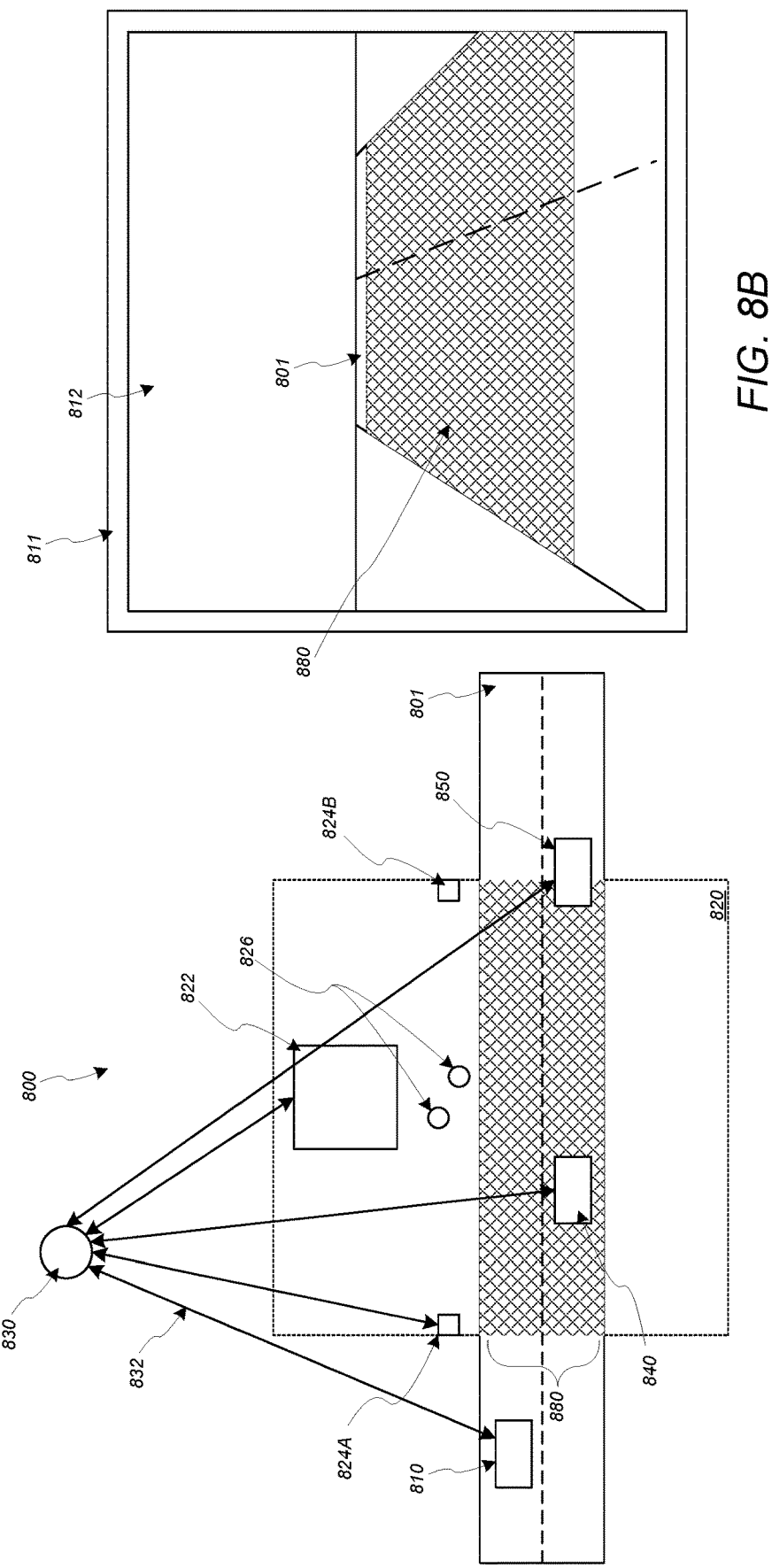

VISUAL CONTENT OVERLAY SYSTEM

This application is a divisional of U.S. patent application Ser. No. 15/762,543, filed Mar. 22, 2018, which is a 371 of PCT Application No. PCT/US2016/053182, filed Sep. 22, 2016, which claims benefit of priority to U.S. Provisional Patent Application No. 62/232,855, filed Sep. 25, 2015. The above applications are incorporated herein by reference. To the extent that any material in the incorporated application conflicts with material expressly set forth herein, the material expressly set forth herein controls.

BACKGROUND

In many situations, a graphical overlay can be provided on an environment that is perceived through a transparent surface, including a window. A graphical overlay can provide information to an observer, including information which is relevant to one or more portions of the perceived environment. In some cases, a graphical overlay is used in a vehicle, where a graphical overlay can be perceived by an occupant of the vehicle and provides information relevant to one or more of the vehicle, including vehicle speed, and one or more portions of the environment in which the vehicle is located. Such information can be provided on a transparent surface, including a forward window, also referred to herein as a windscreen, windshield, etc., such that the information can be perceived by an operator of the vehicle, including a driver, near the line of sight of the operator as the operator observes the environment through which the vehicle is navigated, including an oncoming roadway.

In some cases, the graphics displayed should be able to overlay certain objects located in the environment perceived though the transparent surface and can augment, alter, control, information related to the environment which is provided to an observer via the transparent surface. Such graphical overlays can be referred to as an augmented reality display.

BRIEF DESCRIPTION OF THE DRAWINGS

FIG. 4A-B illustrate a vehicle comprising a transparent surface which provides an augmented reality display which provides a representation of a static object in the environment which is presently obscured from direct view through the transparent surface of the vehicle, according to some embodiments.

FIG. 7A-B illustrate a vehicle which simulates, via one or more of a transparent surface which provides an augmented reality display and an active suspension system, one or more objects in the environment, according to some embodiments.

FIG. 8A-B illustrate a vehicle comprising a transparent surface which provides an augmented reality display which indicates a particular driving zone in the environment, according to some embodiments.

DETAILED DESCRIPTION

Figure 1:
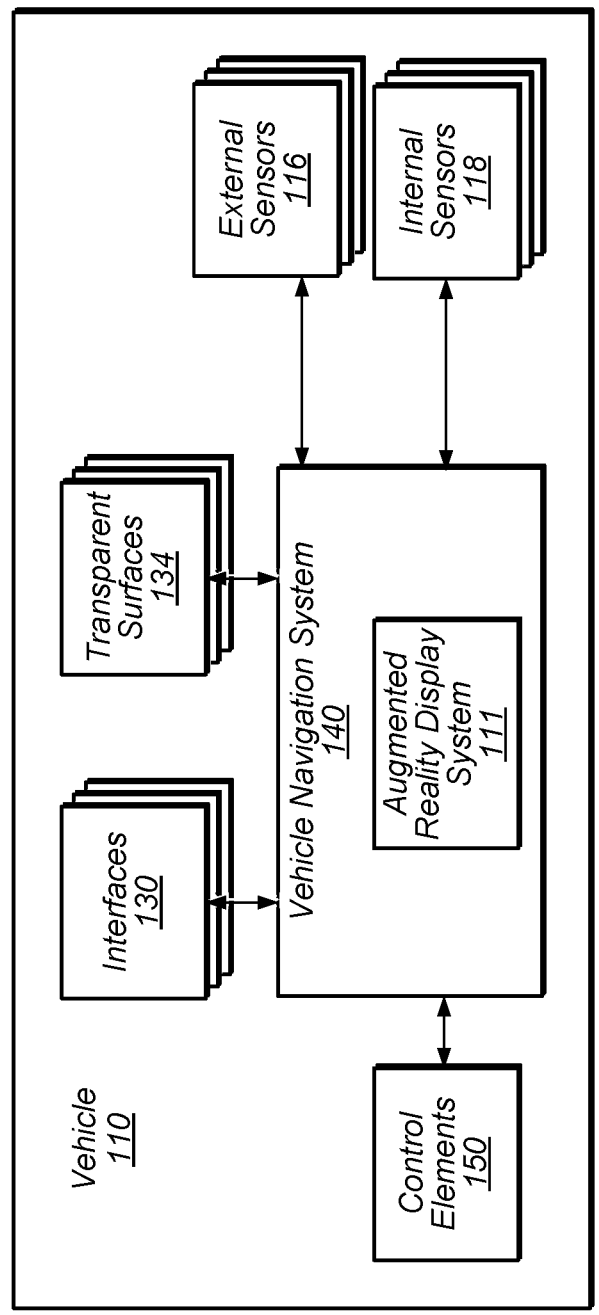
FIG. 1 illustrates a vehicle, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values.

The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

FIG. 1 illustrates a vehicle, according to some embodiments. The vehicle 110 is located in an external environment 100 and can include a vehicle navigation system (VNS) 140. In some embodiments, the VNS 140 can autonomously control one or more vehicle control elements 150 to cause the vehicle 110 to be autonomously navigated along one or more driving routes through the environment 100. In some embodiments, VNS 140 controls display of information to one or more occupants of the vehicle via one or more interfaces 130. At least one of the interfaces 130 can include a transparent surface via which an occupant can perceive one or more portions of the environment 100, and the VNS 140 can control a display of information to the occupant via a graphical overlay on the transparent surface which provides an augmented reality display of one or more portions of the environment perceived by the occupant via the transparent surface.

Vehicle 110 includes one or more sets of external sensors 116 which generate sensor data representations of one or more portions of the external environment 100. The external sensors 116 can include one or more of visible light camera devices, infrared camera devices, near-infrared camera devices, light beam scanning devices, ultrasonic sensor devices, audio sensor devices, depth camera devices, radar devices, geographic position detection devices, some combination thereof, etc. Sensor data representations generated by one or more of the external sensors 116 can be communicated to the VNS 140, and the VNS can generate and maintain a world model of one or more portions of the environment 100 based on the sensor data representations generated by the external sensors 116. In some embodiments, the VNS 140 generates and maintains a world model based at least in part upon information received from a remote service, system, device, etc. via one or more communication networks.

Vehicle 110 includes a set of one or more internal sensors 118 which generate sensor data representations of one or more portions of a vehicle interior included in the vehicle 110, including sensor data representations of one or more occupants of the vehicle, also referred to herein as users. The internal sensors 118 can include one or more of visible light camera devices, infrared camera devices, near-infrared camera devices, light beam scanning devices, ultrasonic sensor devices, audio sensor devices, depth camera devices, radar devices, some combination thereof, kinematic sensor devices, etc. In some embodiments, one or more internal sensors 118 generates sensor data associated with a state of one or more portions of the vehicle, including one or more of the control elements 150. Such one or more internal sensors can include one or more of an accelerometer, a speedometer, etc.

Vehicle 110 includes one or more control elements 150 which cause the vehicle to be navigated. Control elements can include one or more of a steering control element, a motor, a throttle control element, a brake control element, etc.

Vehicle 110 includes one or more interfaces 130, which can include one or more user interfaces installed in the vehicle with which one or more occupants can interact, one or more communication interfaces which can communicate with one or more remotely located devices, vehicles, services, systems, etc. via one or more communication networks. Vehicle 110 includes one or more transparent surfaces 134 via which one or more occupants can perceive one or more portions of the environment 100 from within the vehicle interior, etc. In some embodiments, VNS 140 can generate, manage, control, etc. one or more graphical displays, including one or more augmented reality displays, which are displayed on one or more particular transparent surfaces 134 in the vehicle.

As shown, the VNS 140 can include an augmented reality display module 111, also referred to herein as an augmented reality display system. In some embodiments, one or more of the VNS 140 and the module 111 can be implemented by one or more computer systems. In some embodiments, the VNS 140 and the module 111 are implemented by separate computer systems. Module 111 can generate one or more various augmented reality displays which are provided to one or more occupants via one or more transparent surfaces 134 in the vehicle 110 based on information received via processing data received from one or more of the interfaces 130, external sensors 116, and internal sensors 118.

Figure 2B:
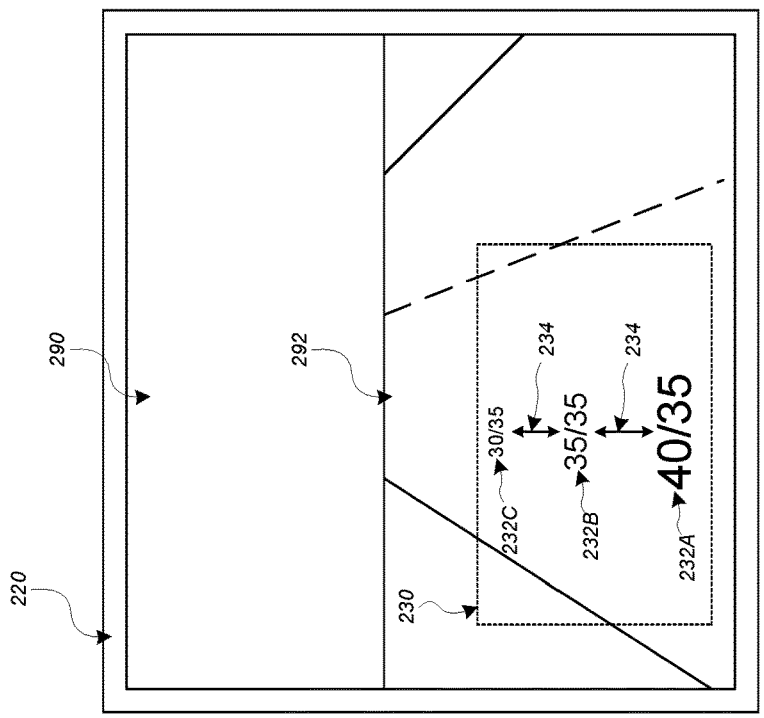
FIG. 2A-B illustrate a vehicle comprising a transparent surface which provides an augmented reality display indicating a spatial indication of a speed of the vehicle relative to a local speed limit, according to some embodiments.
Figure 2A:
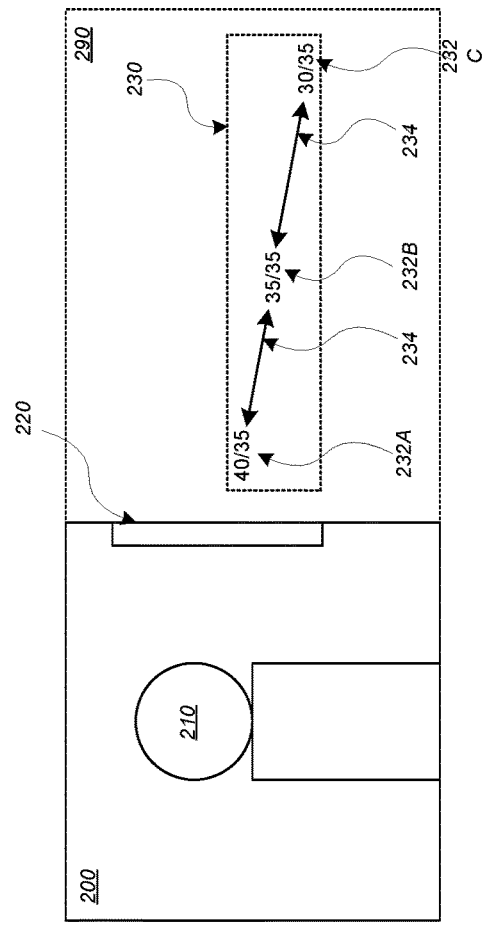

FIG. 2A-B illustrate a vehicle comprising a transparent surface which provides an augmented reality display which includes a spatially positioned representation of a speed of the vehicle relative to a local speed limit, according to some embodiments. The vehicle and transparent surface illustrated in FIG. 2A-B can be included in any of the embodiments of vehicles and transparent surfaces included herein.

In some embodiments, an augmented reality display provided to an occupant of a vehicle, via being displayed on one or more transparent surfaces of the vehicle, includes a display element which provides a three-dimensional representation of a speed of the vehicle where representation of the speed is spatially positioned, in the environment, based on a difference between the vehicle speed and a local speed limit. The vehicle can include an augmented reality system which, based on sensor data generated by one or more internal sensors, external sensors interfaces, etc, can determine a present speed of the vehicle and a local speed limit in the portion of the environment through which the vehicle is presently being navigated.

The augmented reality display system can generate an augmented reality display on a transparent surface of the vehicle which includes a display element which both indicates a speed of the vehicle and provides at least a spatial indication of the speed of the vehicle, relative to the local speed limit. In some embodiments, the display element includes a representation of at least the speed of the vehicle. The augmented reality display can comprise an overlay of at least a portion of the environment visible, also referred to herein as perceptible, via the transparent surface. The overlay can include display elements, also referred to herein as representations, which provide three-dimensional representations of one or more various graphical icons, such that the three-dimensional representations are perceptible as being positioned in the external environment when the environment is perceived via the augmented reality display presented on the transparent surface. A display element which provides a three-dimension representation of a graphical icon at a particular position in the environment can be referred to as being spatially positioned in the environment and can be referred to as being spatially positioned. Where the display element provides a three-dimensional representation of a graphical icon in a particular position in the environment based on relative vehicle speed, the display element can be referred to as providing a spatial indication of the relative vehicle speed. Spatial positioning of a representation presented by a display element in the augmented reality display can be implemented via controlling one or more of the size and position of the graphical icon comprised in the display element presented on the transparent surface, so that the graphical icon can appear to be further away from the transparent surface, nearer to the transparent surface, in different portions of the environment, etc., based on the relative speed of the vehicle.

As shown in FIG. 2A-B, a vehicle 200 in which an occupant 210 is located can include a transparent surface 220, including a windshield, via which the occupant perceives at least a portion of the external environment 290. The occupant 210 can be a driver of the vehicle 200, positioned in a driver position in the vehicle, some combination thereof, etc., and the transparent surface 220 can include a windshield via which the occupant can perceive a portion of the environment 290 which is ahead of the vehicle along a direction of travel while the vehicle navigates along a roadway 292 in the environment.

As shown, an augmented reality display 230 can be displayed ("presented", "provided", etc.) on surface 220, so that the display 230 is perceptible by occupant 210 monitoring the portion of the environment 290 via the surface 220 and the display 230 is perceptible as an overlay upon the environment perceptible by occupant 210 via surface 220. As shown in FIG. 2A-B, the display 230 can include one or more display elements 232A-C which include content which indicates at least a speed of the vehicle, such that the display elements comprise representations of at least the speed of the vehicle. For example, element 232A indicates a speed of 40 mph, element 232B indicates a speed of 35 mph, and element 232C indicates a speed of 30 mph. In some embodiments, the illustrated elements 232A-C indicate different states and configuration of a single element when the vehicle 200 is navigating at different speeds, such that the individual element is perceptible as being spatially positioned at an individual position in the environment.

As further shown, in some embodiments, the element 232A-C can include content indicating a local speed limit associated with the environment, including the local roadway 292. FIG. 2A-B shows that the local speed limit is 35 mph, and the display 230 includes an element 232A-C which indicates both the present speed of the vehicle and the local speed limit.

In some embodiments, the one or more display elements 232 presented via display 230 are adjustably controlled to cause the perceived elements 232 to provide three-dimensional representations of one or more graphical icons which are spatially positioned in one or more portions of the environment perceptible through surface 220 based on the relative speed of the vehicle relative to a local speed limit. The spatial positioning can include adjusting one or more various parameters of the one or more display elements 232, including one or more of a size, color, position, etc. of the elements 232 in the display 230, to cause the element 232 to be perceived as being spatially positioned in the environment 290 based on the relative speed of the vehicle 200. The parameters of an individual display element 232 can be dynamically adjusted based on variations in the vehicle speed, local speed limit, etc., so that the three-dimensional representation of a spatial position of the graphical icon in the environment is dynamically adjusted.

As shown in FIG. 2A-B, the spatial positioned representation of an icon in the environment by the display element 232 in the display 230, based on the relative speed of the vehicle 210, can include adjustably controlling one or more parameters of the display element to cause the representation of the icon to be spatially positioned closer to the occupant 210 in the vehicle 200 as the speed of the vehicle 200 increases beyond the local speed limit and to cause the y controlling one or more parameters of the display element to cause the representation to be spatially positioned further from the occupant 210 in the vehicle 200 as the speed of the vehicle 200 decreases below the local speed limit.

For example, icon 232 is shown to be displayed in configuration 232B, so that the icon 232 is displayed as being positioned a particular distance from the vehicle 200 along roadway 292, where the vehicle speed matches the local speed limit, shown here as 35 mph. In some embodiments, the display 230 can be controlled to cause the displayed icon 232 to be positioned 234 within a certain portion of the roadway 292, so that the element 232 is repositioned in the display 230 to cause the three-dimensional representation of the graphical icon indicating the vehicle speed to appear to follow various turns, slopes, etc. of the roadway 292 while remaining a particular perceived distance from the vehicle in the environment 290.

As shown in FIG. 2A-B, one or more parameters of the element 232 can be adjusted, via adjusting one or more parameters of the displayed element 232, so that the three-dimensional representation of the icon is positioned in a configuration 232A in the environment which is located closer to vehicle 200 as the vehicle speed increases beyond the local speed limit. The repositioning 234 can be dynamic, so that the icon is dynamically spatially repositioned in the environment 290 in accordance with the speed of the vehicle 200. As shown in FIG. 2B, spatial repositioning can include adjusting a size and position of the element 232 so that the representation of the icon appears larger and nearer as vehicle speed is greater than the local speed limit and smaller and further away as the vehicle speed is less than the local speed limit. The spatial positioning of the graphical icon in the environment provided by the three-dimensional representation of the icon presented by the display element 232 can provide the occupant 210 with a visual cue with regards to the relative speed of the vehicle 200, thereby augmenting the occupant's situational awareness, particularly where the occupant 210 is a driver of the vehicle 200, thereby augmenting vehicle navigation by the driver occupant 210.

As shown in FIG. 2A-B, the repositioning 234 of the perceived position of icon in the environment 290 by element 232 can be adjusted to cause a perceived elevation of the element 232 in the environment to be adjusted based on the relative speed of the vehicle, relative to a local speed limit. As shown in FIG. 2A, for example, parameters of the displayed icon presented by element 232 can be adjusted to cause the displayed icon to appear at a higher elevation in accordance with the vehicle speed being greater than a local speed limit, as shown at 232A, and to cause the displayed icon, which can also be referred to herein as a representation of the vehicle speed, to appear at a lower elevation in accordance with the vehicle speed being less than a local speed limit, as shown at 232C. Such adjustment of perceived elevation can occur concurrently with adjustment of a perceived proximity of the icon from the vehicle, as shown in FIG. 2A.

Figure 3B:
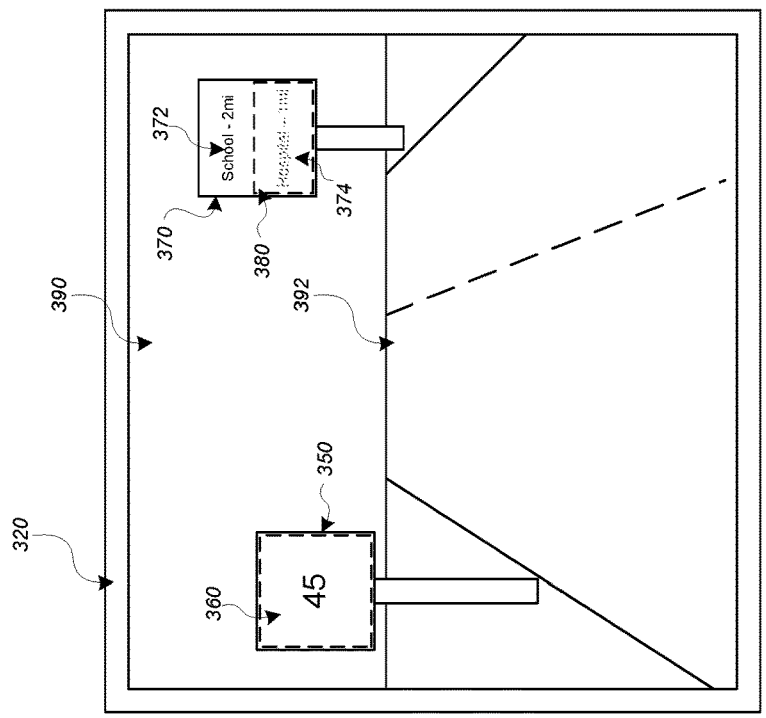
FIG. 3A-B illustrate a vehicle comprising a transparent surface which provides an augmented reality display which modifies occupant-perceived information presented by a sign located in the external environment, according to some embodiments.
Figure 3A:
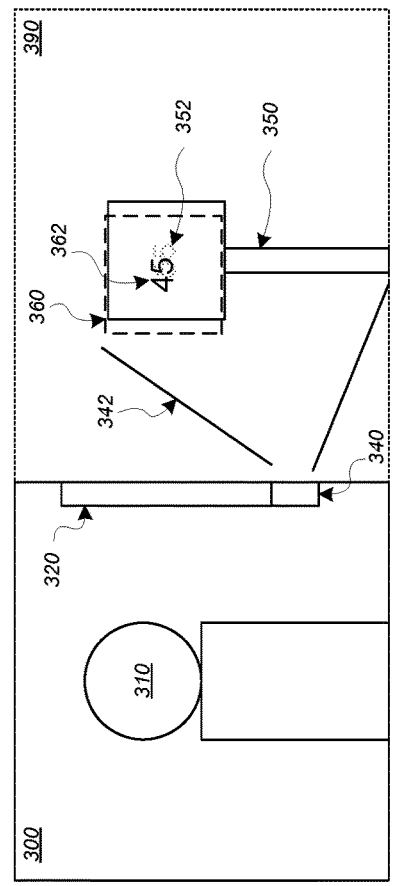

FIG. 3A-B illustrate a vehicle comprising a transparent surface which provides an augmented reality display which modifies occupant-perceived information presented by a sign located in the external environment, according to some embodiments. The vehicle and transparent surface illustrated in FIG. 3A-B can be included in any of the embodiments of vehicles and transparent surfaces included herein.

In some embodiments, an augmented reality display system generates, on a transparent surface, an augmented reality display of a portion of an external environment which can be perceived via the transparent surface, where the augmented reality display comprises display elements which overlay one or more portions of the environment which include one or more objects in the environment and which at least partially conform to one or more boundaries of the one or more objects in the environment. The display elements can overlay content included on the external surfaces of the objects and can include replacement content which can be generated by the augmented reality display system, such that the augmented reality display element which overlays at least a portion of the object, as perceived via the transparent surface, obscures at least a portion of the content included on the object in the environment with augmented reality content generated by the augmented reality display system.

As shown in FIG. 3A-B, vehicle 300 in which occupant 310 is located includes a transparent surface 320 and an external sensor 340 which monitors 342 one or more portions of environment 390 in which vehicle 300 is located, including a roadway 392 along which the vehicle 300 is navigated. Based on sensor data representations of the monitored environment, which are generated by the sensors 340, an augmented reality display system included in vehicle 300 can identify one or more objects located in the environment 390, including a roadway 392 and road signs 350, 370. Based on processing the sensor data, the augmented reality display system can identify content 352, 372, 374 presented on the signs. For example, the system can identify sign 350 as a speed limit sign and further identify that content 352 presented on the sign 350 includes a local speed limit of roadway 392, and the system can further identify sign 370 as a distance indication sign and further identify that content 372 presented on the sign includes an indication of a distance to a particular landmark and that content 374 presented on the sign includes an indication of a distance to another particular landmark.

In some embodiments, the augmented reality system included in vehicle 300 generates an augmented reality display, on surface 320, which includes display elements 360, 380 which overlay and conform to one or more boundaries of one or more particular portions of particular objects 350, 370 in the environment 390.

The display elements can be selectively generated, and can include content selectively generated by the augmented reality display system, based on monitoring one or more of personal data associated with the occupant, a driving route along which the vehicle is being navigated, the environment 390, etc. For example, the augmented reality display system can determine, based on monitoring environmental conditions via sensors 340, that environmental conditions, that environmental conditions are associated with an adjustment to the local speed limit. Where the present environmental conditions are determines to include a rainstorm, for example, the augmented reality system can determine, based on comparing the determined environmental condition with a database of speed limit adjustments and associated environmental conditions, that the local speed limit is to be adjusted downwards by 5 mph. As a result, the augmented reality display system can generate a display element 360 which is perceived by occupant 310 to overlay and conform to the dimensions, boundaries, etc. of the content-including portion of sign 350 and includes content 362 which includes a local speed limit which is adjusted from the speed limit 352 actually included on sign 350 in accordance with the detected environmental condition. The display element 360 can provide a representation of the sign 350 which overlays the portion of the sign 350 which includes content 352, so that the content 352 is obscured and content 362 is visible when the sign 350 is perceived via the augmented reality display presented on surface 320.

In another example, shown in FIG. 3B, the augmented reality display system can process distance information presented on sign 370 and compare the information 372, 374 with a driving route along which the vehicle 300 is being navigated. The augmented reality display system can generate one or more display elements which selectively highlight one or more indicated landmarks, directions, etc., selectively obscure one or more indicated landmarks, directions, etc. based on the driving route. In some embodiments, the system can translate content presented on a sign into another language, including a language associated with one or more of the vehicle, an occupant included in the vehicle, personal data associated with an occupant included in the vehicle, etc., and generate a display element which overlays the content and provides a translated version of the content on the sign.

As shown in FIG. 3B, based on a determination that content 372 is associated with the present driving route along which the vehicle 300 is being navigated, for example, a destination of the driving route, a checkpoint along the driving route, some combination thereof, etc., the augmented reality display system included in vehicle 300 can generate a display element 380 which has a particular size, shape, and position on surface 320 to cause the element 380, when perceived by occupant 310 via surface 320, to overlay and conform to a portion of sign 370 on which content 374 which is unrelated to the driving route is displayed, so that the element 380 obscures the unrelated content 374 so that the perceived content on the sign 370 is restricted to the relevant content 372.

In some embodiments, based on a determination that one or more instances of content on the 370 is related to a driving route along which the vehicle 300 is being navigated, the augmented reality display system can generate a display element which highlights one or more instances of content displayed on a sign in the environment.

Display elements presented on surface 320 as part of the augmented reality display on surface 320 can be generated based on sensor data generated by sensors 340, where the display elements are adjusted based on the dynamic relative positions of the objects 350, 370 to vehicle 300, so that the display elements 360, 380 are perceived to remain conformed to the objects 350, 370 as the vehicle changes position relative to the objects.

In some embodiments, the augmented reality display system generated display elements on surface 320 based on personal data associated with occupant 310. For example, the display system can determine, based on processing sensor data representations of sign 370, that content 372 indicates a landmark which is a commonly-navigated destination associated with personal data of the occupant 310.

As a result, the augmented reality display system can provide an augmented reality display of the environment 390 which is relevant to the occupant's 310 interests.

Users can selectively block use of, or access to, personal data. A system incorporating some or all of the technologies described herein can include hardware and/or software that prevents or blocks access to such personal data. For example, the system can allow users to "opt in" or "opt out" of participation in the collection of personal data or portions of portions thereof. Also, users can select not to provide location information, or permit provision of general location information (e.g., a geographic region or zone), but not precise location information.

Entities responsible for the collection, analysis, disclosure, transfer, storage, or other use of such personal data should comply with established privacy policies and/or practices. Such entities should safeguard and secure access to such personal data and ensure that others with access to the personal data also comply. Such entities should implement privacy policies and practices that meet or exceed industry or governmental requirements for maintaining the privacy and security of personal data. For example, an entity should collect users' personal data for legitimate and reasonable uses, and not share or sell the data outside of those legitimate uses. Such collection should occur only after receiving the users' informed consent. Furthermore, third parties can evaluate these entities to certify their adherence to established privacy policies and practices.

FIG. 4A-B illustrate a vehicle comprising a transparent surface which provides an augmented reality display which includes a display element which provides a representation of a static object in the environment which is presently obscured from direct view through the transparent surface of the vehicle, according to some embodiments. The representation can include a three-dimensional representation of the static object in the environment. The vehicle and transparent surface illustrated in FIG. 4A-B can be included in any of the embodiments of vehicles and transparent surfaces included herein.

In some embodiments, an augmented reality display system generates an augmented reality display, on a transparent surface, which includes display elements providing representations of objects, in an environment perceivable via the transparent surface, which are at least partially obscured from direct observation via the transparent surface.

In some embodiments, the augmented reality display system included in a vehicle 410 navigating along a roadway 400 through environment 490 receives information regarding various static objects, including one or more structures, signs, landmarks, plants, etc., in the environment 490, via a communication link 452 with a remotely located system 450. The information can include location information, dimensions, etc. associated with an object. For example, where environment 490 includes static object 430 located adjacent to roadway 400, information indicating the location and dimensions of object 430 can be received at vehicle 410 via link 452.

In some embodiments, the augmented reality display system included in vehicle 410 determines a blind spot 440 associated with sensor data representations of the environment 490 which are generated by sensor devices included in the vehicle 410, based on a presence of one or more various objects, including the illustrated vehicle 420, in the environment. In some embodiments, based on a determination that a dynamic object 420 is at least partially obscuring perception of a static object 430 via a transparent surface 480 in the vehicle 410, the augmented reality display system included in the vehicle can generate an augmented reality display which includes display elements 492-496 which comprise representations of the position and boundaries of one or more portions of one or more obscured elements in the environment 492, including an element 492 which indicates at least a portion of the obscured static object 430. As also shown in FIG. 4B, the display elements presented via the transparent surface 480 can include representations of portions 494-496 of the roadway which are obscured by object 420.

In some embodiments, the augmented reality display system selectively generates display elements 492 which comprise representations of one or more of a position, boundary, etc. of at least a portion of an obscured static object in the environment based on a determination that the static object is associated with one or more of a driving route along which the vehicle is being navigated, one or more instances of personal data associated with one or more of the occupants of the vehicle 410, some combination thereof, etc.

Figure 5B:
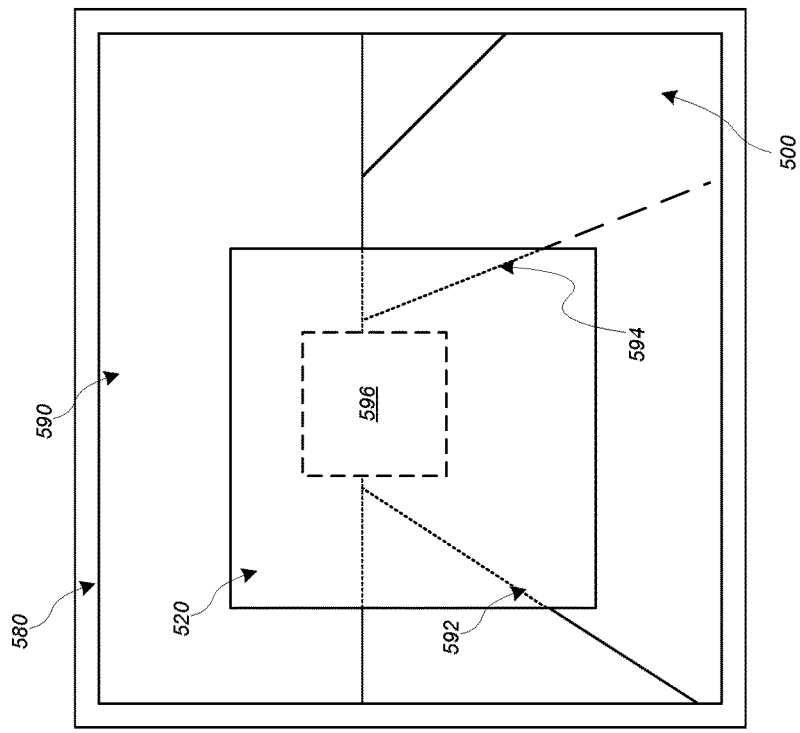
FIG. 5A-B illustrate a vehicle comprising a transparent surface which provides an augmented reality display which provides a representation of at least one dynamic object in the environment which is presently obscured from direct view through the transparent surface of the vehicle, according to some embodiments.
Figure 5A:
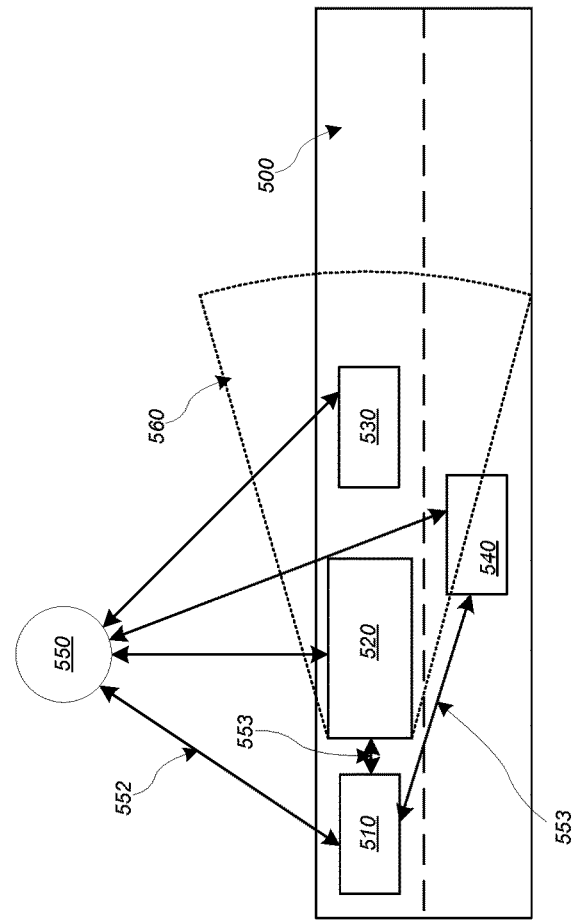

FIG. 5A-B illustrate a vehicle comprising a transparent surface which provides an augmented reality display which provides a representation of at least one dynamic object in the environment which is presently obscured from direct view through the transparent surface of the vehicle, according to some embodiments. The vehicle and transparent surface illustrated in FIG. 5A-B can be included in any of the embodiments of vehicles and transparent surfaces included herein.

In some embodiments, an augmented reality display system included in a vehicle 510 navigating through an environment 590 which includes a roadway can generate, on a transparent surface 580 included in the vehicle 510, an augmented reality display element 596 which represents a position and dimension of a dynamic element 530, in the environment 590, which is at least partially obscured 560 from monitoring by vehicle 510 by another dynamic element 520 in the environment 590.

In some embodiments, the augmented reality display system receives information associated with the obscured object 530, including sensor data representations of the object 530, based on communication with one or more of a remote system 550 via a communication link 552, vehicle-to-vehicle ("V2V") communication with one or more vehicles 520, 540 which can directly monitor the object 530 via links 553, etc. The augmented reality display system can generate the augmented reality display elements 592-596, including the element 596 which indicates a position and dimensions of the dynamic element 430 in the environment, based on information received from one or more of the vehicles 520, 540, systems 550, etc.

Figure 6B:
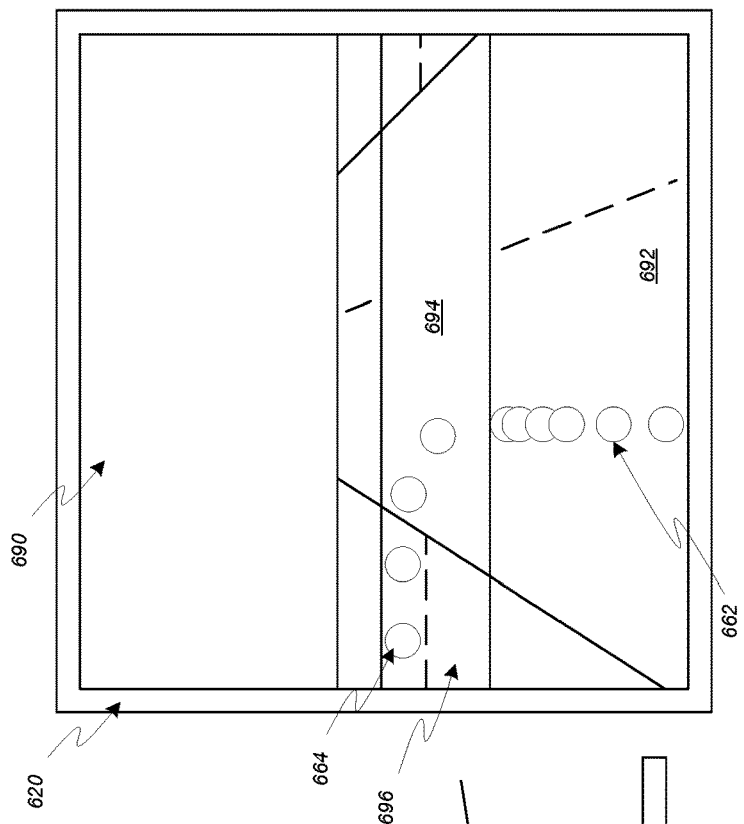
FIG. 6A-B illustrate a vehicle comprising a transparent surface which provides an augmented reality display which provides a dynamically controllable representation of a driving route along which a vehicle is being navigated, according to some embodiments.
Figure 6A:
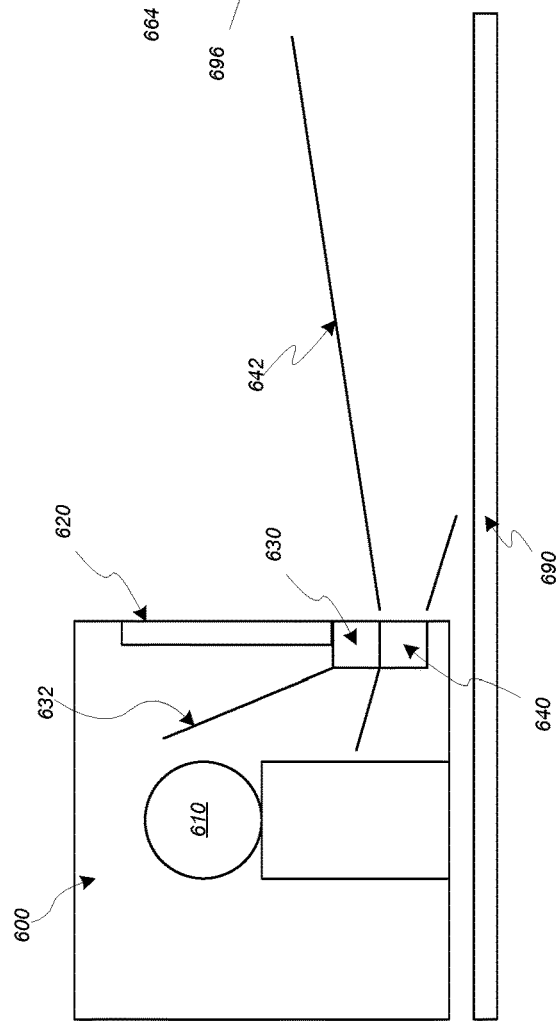

FIG. 6A-B illustrate a vehicle comprising a transparent surface which provides an augmented reality display which provides a dynamically controllable representation of a driving route along which a vehicle is being navigated, according to some embodiments. The vehicle and transparent surface illustrated in FIG. 6A-B can be included in any of the embodiments of vehicles and transparent surfaces included herein.

In some embodiments, an augmented reality display system included in a vehicle generates an augmented reality display, on one or more transparent surfaces of the vehicle, which includes display elements which comprise a representation of a driving route along which the vehicle is being navigated. As referred to herein, a representation comprised by a display element can include a three-dimensional representation. The display elements can comprise representations of various navigation actions which can be executed by control elements of the vehicle, including braking, accelerating, turning, etc.

As shown in FIG. 6A-B, where vehicle 600 navigates through an environment 690 which includes roadways 692-696, a set of one or more external sensors 640 monitors 642 the environment, including the roadways 692-694 and generates sensor data representations of same. An augmented reality display system included in vehicle 600 can, based on the sensor data representations of the environment and a driving route, through the environment, along which the vehicle 600 is being navigate, generates an augmented reality display on a transparent surface 620 of the vehicle 600. The augmented reality display includes elements 662, 664 which provide visual indications of the route along which the vehicle 600 is being navigated. The display elements can be adjustably controlled to cause the elements 662, 664 to be perceived as being located in the environment 690 along the driving route, and parameters of the display elements can be dynamically adjusted as the vehicle 600 navigates along the route to maintain a three-dimensional appearance of the elements 662, 664 on the route.

As shown, the displayed elements 662, 664 on the surface are arranged on the roadways 692-696 to illustrate a driving route which proceeds along roadway 692 to roadway intersection 694, whereupon the route turns to the left to roadway 696, thereby indicating that the driving route proceeds along the course illustrated in the display by elements 662, 664. In addition, the display elements 662, 664 are displayed to be perceived as being spatially positioned along the route in accordance with the acceleration, velocity, etc. of the vehicle 600 along the route. As shown, the elements 662 are displayed as being spatially positioned proximate to each other proximate to roadway 692 terminating at intersection 694, thereby providing a visual indication, to occupant 610, that the driving route represented by elements 662 includes the vehicle 600 decelerating at the intersection of roadway 692 with roadway intersection 694, including providing a visual indication that the vehicle 600, being navigated along the represented driving route, will stop at the threshold of intersection 694. In addition, elements 694 are displayed so that the elements are perceived as being spaced further apart in the environment 690, relative to elements 662, thereby providing a visual indication, to occupant 610, that the vehicle 600 will accelerate through roadways 694-696 subsequent to decelerating to the threshold between roadways 692, 694.

In some embodiments, an augmented reality display system dynamically controls the display elements included in an augmented reality display which is presented on one or more transparent surfaces based on monitoring one or more occupants located proximate to the one or more transparent surfaces. The system can monitor occupant identity, stress level, cognitive load, etc. based on processing sensor data generated by one or more internal sensors 630 included in the vehicle 600 which monitor 632 one or more portions of the vehicle 600 interior in which one or more occupants 610 are located. Monitoring occupant identity can include comparing a sensor data representation of an occupant 610 with personal data to associate an occupant 610 of the vehicle with a particular user profile, account, etc. Augmented reality displays can be adjusted based on occupant display preferences which may be included in a user account, profile, etc. associated with a particular occupant identity.

In some embodiments, the augmented reality display system can adjust the display elements presented in the augmented reality display which can be perceived by a monitored occupant 610 based on an interaction history, indicated in personal data associated with the monitored occupant 610, where the interaction history indicates a historical record of interaction between the occupant 610 and one or more of the vehicle 600, the augmented reality display system included in the vehicle, one or more particular features of the vehicle 600, including autonomous navigation of the vehicle along a driving route, some combination thereof, etc. For example, where the augmented reality display system determines, based on identifying occupant 610 and processing personal data associated with the occupant, that the occupant is associated with a quantity of interactions with features of the vehicle 600 associated with navigating the vehicle 600 along a driving route, and a display of elements 662, 664 on surface 620 which are associated with navigation along the route, which at least meets a threshold quantity, the augmented reality display system may refrain from displaying elements 662, 664 in an augmented reality display on surface 620, as the occupant may be determined to be sufficiently experienced with navigation along a driving route in vehicle 600 that the occupant 610 is determined to not require visual indications that the vehicle 600 is navigating along a driving route. In another example, where the augmented reality display system determines, based on identifying occupant 610 and processing personal data associated with the occupant, that the occupant is associated with a quantity of interactions with features of the vehicle 600 associated with navigating the vehicle 600 along a driving route, and a display of elements 662, 664 on surface 620 which are associated with navigation along the route, which does not meet a threshold quantity, the augmented reality display system may display elements 662, 664 in an augmented reality display on surface 620, as the occupant may be determined to be insufficiently experienced with navigation along a driving route in vehicle 600 that the occupant 610 is determined to require visual affirmation that the vehicle 600 is navigating along a driving route.

In some embodiments, monitoring a stress level, cognitive load, etc. of an occupant can include monitoring one or more various features of an occupant, including eye motion, body posture, body gestures, body temperature, breathing rate, eye blink rate, head motion, eye motion, heart rate, some combination thereof, etc. Based on determining that one or more monitored features of an occupant 610 is associated with a determined value which at least meets a threshold level associated with a particular stress level, cogitative load level, etc. the augmented reality display system can determine that a monitored occupant 610 is associated with the particular stress level, cognitive load level, etc.

The augmented reality display system can dynamically adjust the augmented reality display, including which display elements are presented in the display, based on the monitored stress level, cognitive load level, etc. of one or more of the monitored occupants 610. For example, where an occupant 610 is determined to be associated with a high cognitive load level, the augmented reality display system can adjust the augmented reality display to remote at least some of the display elements, for example removing elements 662, 664, to cause the occupant 610 cognitive load to be reduced. In another example, where an occupant 610 is determined to be associated with a high stress level, the augmented reality display system can adjust the augmented reality display to provide at least some elements, including elements 662, 664, which are associated with control of the vehicle, thereby providing indications to the occupant 610 of the navigation actions being executed during navigation of the vehicle and assurance that the vehicle is being navigated along a driving route to a destination.

FIG. 7A-B illustrate a vehicle which simulates, via one or more of a transparent surface which provides an augmented reality display and an active suspension system, one or more objects in the environment, according to some embodiments. The vehicle and transparent surface illustrated in FIG. 7A-B can be included in any of the embodiments of vehicles and transparent surfaces included herein.

In some embodiments, an augmented reality display system can display, in an augmented reality display on a transparent surface, a display element which comprises a representation of a simulated environmental object in the perceived environment. The representation can include a three-dimensional representation. The simulated environmental object can be represented based on monitoring manual navigation of a vehicle by an occupant of the vehicle, where the simulated environmental object is generated to cause the occupant to adjust the manual driving performance of the occupant. The augmented reality display system can monitor the driving performance of an occupant based on processing sensor data generated by one or more external sensors, internal sensors, etc. included in the vehicle.

For example, as shown in FIG. 7A-B, an augmented reality system included in vehicle 700, which is navigating along roadway 790 through environment 721, can determine, based on processing sensor data generated by one or more external sensors 740 monitoring 742 the environment 721, one or more internal sensors 730 monitoring 732 one or more portions of the vehicle 700, some combination thereof, etc., that the occupant 710 is navigating the vehicle 700 along roadway 790 at a speed which at least meets an excessive speed threshold value. In response, the augmented reality display system can generate an augmented reality display, presented on surface 720, which includes one or more display elements 780 which comprise a three-dimensional representation of a simulated environmental object, thereby simulating the presence of an environmental object, in the environment 721, which is associated with reducing vehicle speed. The simulated environmental object 780 shown in FIG. 7A-B simulates the presence of a "speed bump" element in a particular position on the roadway 790. The augmented reality display system can initially generate the display element 780 to cause the simulated environmental object to be simulated to be positioned at a particular position on the roadway which is at a distance ahead of the vehicle 700, based on one or more of the present vehicle 700 speed, an estimated reaction time of the occupant 710, etc. The displayed element 780 can be dynamically adjusted in the display on surface 720 as the vehicle 700 is navigated along roadway 790, so that the occupant 710 monitoring 712 the environment 721 through surface 720 can perceive the simulated speed bump 780 as a static element on the roadway 790 which remains at the particular position on the roadway as the vehicle 700 approaches the particular position. The augmented reality display system can display one or more simulated environmental object display elements 780 as the vehicle is navigated in response to manual navigation of the vehicle, occupant driving performance, etc., meeting one or more various thresholds, and the display of such simulated environmental object display elements 780 can be precluded in response to the manual navigation of the vehicle, occupant driving performance, etc., being determined to be below one or more various thresholds.

In some embodiments, the augmented reality display system can communicate with one or more control elements of the vehicle 700 to provide additional simulation of an environmental object in the environment 721. As shown, vehicle 700 can include a set of wheels 760 which are coupled to the remainder of the vehicle 700 at least partially by one or more suspension systems 750. In some embodiments, one or more of the suspension systems comprises an active suspension system which can actuate to simulate one or more of the wheels 760 passing over one or more environmental objects in the environment 721. In some embodiments, the augmented reality display system in vehicle 700, in addition to generating an augmented reality display element 780 which simulates a static object in the environment 721, can command one or more active suspension 750 control elements in the vehicle 700 to actuate concurrently with the vehicle 700 passing over the position, in the environment 721, in which the simulated environmental object is simulated to be located, so that the active suspension system 750 simulates the vehicle 700 passing over the simulated environmental object. The active suspension systems 750 can be commanded to actuate differently based on different simulated environmental objects. For example, in the illustrated embodiment, where the augmented reality display system simulates a "speed bump" environmental object at a particular position in the roadway via display element 780, the augmented reality display system can command one or more of the active suspension systems 750 to actuate the wheels 760 in a sequence which simulates the vehicle 700 passing over a large obstacle in the roadway 790 when the vehicle passes over the location in the roadway 790 in which the simulated speed bump is represented to be located by display element 780. In another example, where the augmented reality display system simulates a sequential series of small "rumble strip" environmental objects arranged in parallel transversely across a particular position in the roadway via multiple display elements 780, the augmented reality display system can command one or more of the active suspension systems 750 to actuate the wheels 760 in a sequence which simulates the vehicle 700 passing over a series of small obstacles in the roadway 790 when the vehicle passes over the location in the roadway 790 in which the simulated rumble strips are represented to be located by display elements 780.

In some embodiments, the augmented reality display system dynamically adjusts one or more augmented reality display elements which are presented on a transparent surface 720 based on monitoring navigation performance of the vehicle 700. For example, as shown in FIG. 7B, the augmented reality display system can generate display elements 781, 783 which conform to the lane boundaries 782, 784 of the lane 785 in the roadway 790 along which the vehicle 700 is presently being navigated, and the augmented reality display system can dynamically adjust one or more parameters of the display elements 781, 783 based on monitoring, via processing sensor data generated by one or more sensors 740, 730, one or more of the vehicle 700 position relative to one or more of the lane boundaries 782, 784, environmental conditions, occupant cognitive load, etc.

For example, in response to determining that ambient light levels in the environment 721 are below a threshold ambient light level, the augmented reality display system can adjust one or more of the color, brightness, etc. of elements 781, 783 to cause the lane boundaries to be more easily perceptible by occupant 710 monitoring 712 the environment 721 through surface 720. In another example, the augmented reality display system can dynamically adjust one or more of color, brightness, pattern, animation sequence, etc. of separate elements 781, 783 based on relative distance between vehicle 700 and the respective lane boundaries 782, 784 associated with the separate elements 781, 783, to that the occupant 710 is provided, via the augmented reality display on surface 720, with a visual indication that the vehicle 700 is approaching one or more of the lane boundaries 782, 784.

Such visual indications can augment driver situational awareness and can mitigate a risk of the vehicle 700 drifting out of the lane 785 in which it is presently navigating.

FIG. 8A-B illustrate a vehicle comprising a transparent surface which provides an augmented reality display which includes a representation of a particular driving zone in the environment, according to some embodiments. The vehicle and transparent surface illustrated in FIG. 8A-B can be included in any of the embodiments of vehicles and transparent surfaces included herein.

In some embodiments, an augmented reality display system installed in a vehicle navigating through an environment can identify a particular zone in the environment and can, in response, generate an augmented reality display which comprises an overlay of one or more portions of the environment associated with the zone which can be perceived through a transparent surface.

In some embodiments, a particular zone can include one or more of a school zone, a crossing zone, a zone associated with a presence of children, a zone associated with differently-abled individuals, some combination thereof, etc. The augmented reality display system can determine a presence of a particular zone associated with one or more particular individuals, structures, events, etc., including determining one or more boundaries of the particular zone in the environment, based on one or more of communication with one or more remotely located vehicles, devices, systems, services, etc., monitoring of one or more portions of the environment by one or more sensors included in the vehicle, some combination thereof, etc.

FIG. 8A-B illustrate a vehicle 810 navigating through an environment 800 along a roadway 801 in which a region 820 is located. The region 820 can include one or more structures 822, individuals 826, zone identification elements 824A-B, some combination thereof, etc. The augmented reality display system included in vehicle 810 can, based at least in part upon a determination that region 820 is associated with a particular zone, generate an augmented reality display 812, presented on a transparent surface 811 of the vehicle 810, which includes a display element 880 which highlights a portion of the roadway 801 which overlaps with the zone 820. In some embodiments, the display element 880 overlaps an entirety of the zone 820. The highlighted portion of the zone indicated by the display element 880 can conform to one or more boundaries of the zone in the environment, as shown by the highlighted portion of the zone indicated by display element 880 which terminates, at opposite ends, at boundaries of the zone 820. As a result, the augmented reality display system provides, to one or more vehicle occupants perceiving the environment via the transparent surface on which the display is provided, a visual indication of the particular zone, which can augment occupant situational awareness of environmental features associated with the zone and can augment safe navigation of the vehicle through the environment. For example, where the particular zone is a zone associated with the presence of children, a visual indication of the zone in an augmented reality display can augment situational awareness, by a driver of the vehicle, of the possibility that children may be present in the environment, thereby augmenting safety to both the driver and any children in the zone.

In some embodiments, the augmented reality display system determines a location and one or more boundaries of a zone based on identifying one or more zone identification elements 824A-B in the environment. A zone identification element 824 can include one or more of a sign, visual icon, symbol, transponder beacon, etc. which indicates one or more of a presence and boundary of the zone 820. Identifying the zone identification element can include detecting a presence of the object in the environment 824, processing content comprised in the element (e.g., text included on a sign element 824, data comprised in a signal generated by a transponder beacon element 824, etc.), and identifying one or more of the presence of the zone, one or more boundaries of the zone, etc. based on processing the content.

In some embodiments, the augmented reality display system determines a location and one or more boundaries of a zone based on identifying one or more features located in the environment which are determined to be associated with one or more of the presence of the particular zone and one or more boundaries of the zone. Features which can be identified can include one or more static elements, dynamic elements, etc. which can be detected in the environment based on processing sensor data representations, of the environment, which are generated by one or more external sensors included in the vehicle.

In some embodiments, where environment 800 includes structure 822, an augmented reality display system included in vehicle 810 can identify zone 820 based on detecting the structure 822 in the environment 800, based on processing sensor data generated by external sensors in the vehicle 810, and determining that the structure 822 is associated with one or more particular zones. For example, the augmented reality display system can determine that the detected structure 822 is a school structure and can determine, based at least in part upon determining that structure 822 is a school structure, that the structure 822 is associated with a school zone 820 in the environment 800 and can, in response, generate an augmented reality display which includes a display element 880 which overlays a portion of the roadway 801 which overlaps the school zone 820.

In some embodiments, where environment 800 includes one or more individuals 826, an augmented reality display system included in vehicle 810 can identify zone 820 based on detecting the one or more individuals 826 in the environment 800, based on processing sensor data generated by external sensors in the vehicle 810, and determining that the one or more individuals 826 are associated with one or more particular zones. For example, the augmented reality display system can determine that the detected individuals 826 are human child individuals and can determine, based at least in part upon determining that individuals 826 are human child individuals, that the portion of the environment in which the individuals 826 are located is associated with a child zone 820 in the environment 800 and can, in response, generate an augmented reality display which includes a display element 880 which overlays a portion of the roadway 801 which overlaps the child zone 820.

In some embodiments, where environment 800 includes one or more remotely located elements 830, which can include one or more remotely located systems, services, vehicles, devices, etc., an augmented reality display system included in vehicle 810 can identify zone 820 based on communicating 832 with the remotely located element 830 via one or more communication networks and receiving, from the element 830, information identifying one or more of the location and one or more boundaries of the zone 820 in the environment 800. For example, the augmented reality display system can determine an identity, location and boundaries of zone 820 based on receiving information from element 830 via an interface, included in the vehicle 810, which can include one or more communication interfaces. In some embodiments, information identifying a location, boundaries, etc. of the zone at element 830 is generated based on sensor data generated by one or more vehicles 810, 840, 850 navigating through environment 800 and communicating said data to element 830 via one or more communication links. The element can determine one or more of an identity, location, boundaries, etc. of the zone 820 based on processing sensor data generated by the various vehicles navigating through the area, and the determined identity, location, boundaries, etc. of the zone 820 can be communicated to one or more vehicles navigating through the environment 800.

In some embodiments, the display element 880 is associated with the particular zone identified in the environment, and can include content indicating the identity of the zone. For example, element 880 can be associated with one or more colors, animation sequences, instances of text content, instance of audio content, instances of video content, some combination thereof, etc. which indicates the identity of the particular zone indicated by the element 880 (e.g., school zone).

Figure 10:
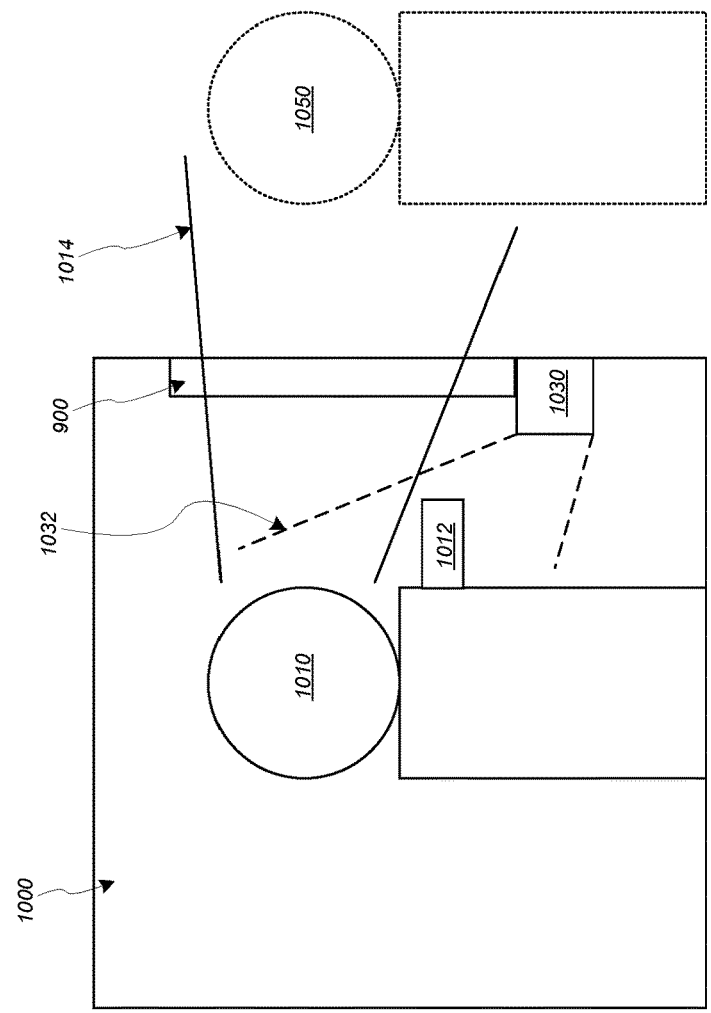
FIG. 10 illustrates a vehicle comprising a transparent surface which provides an augmented reality display which enables user selection of a portion of the environment perceived via the transparent surface and which enables video communication with a remotely-located user via the transparent surface, according to some embodiments.
Figure 9:
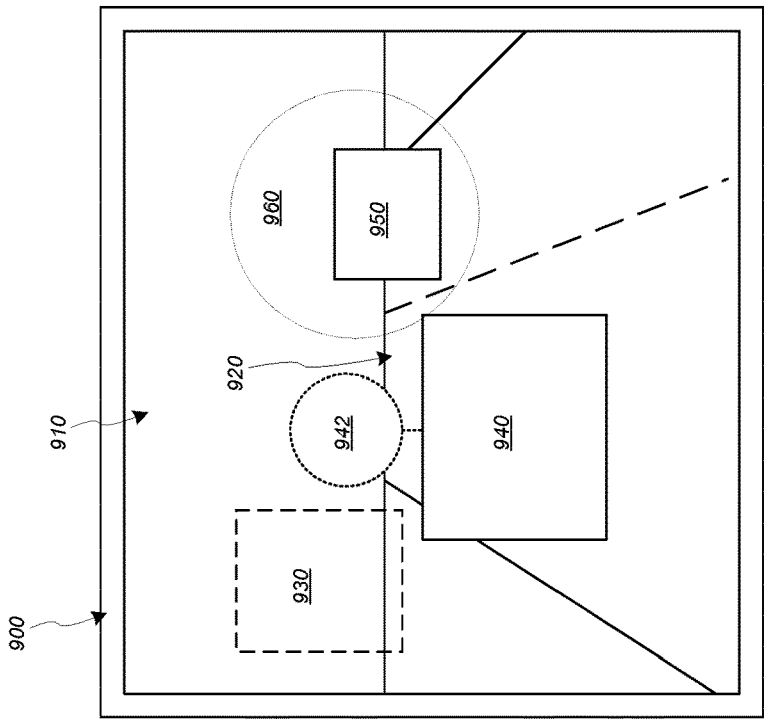
FIG. 9 illustrates a transparent surface which provides an augmented reality display of one or more portions of an environment, according to some embodiments.

FIG. 9 illustrates a transparent surface which provides an augmented reality display of one or more portions of an environment, according to some embodiments. FIG. 10 illustrates a vehicle comprising a transparent surface which provides an augmented reality display which enables user selection of a portion of the environment perceived via the transparent surface and which enables video communication with a remotely-located user via the transparent surface, according to some embodiments. The vehicle and transparent surface illustrated in FIG. 9-10 can be included in any of the embodiments of vehicles and transparent surfaces included herein.

In some embodiments, an augmented reality display system, in response to associating an element in the external environment with a particular user profile, account, etc. associated with a particular user, generates an augmented reality display element, presented on a transparent surface, which identifies the environmental object and includes an avatar icon associated with the particular user profile, account, etc., thereby providing a visual indicator of the user to an occupant perceiving the environment via the transparent surface. The augmented reality display system can selectively generate the avatar display element based on a determination that the particular user is associated with an occupant positioned proximate to the transparent surface through which the environmental object, which can include one or more static elements, dynamic elements, etc., can be perceived.

For example, where the augmented reality display system included in a vehicle (the "ego-vehicle") determines, based on processing external sensor data, that a vehicle 940 navigating proximate to the ego-vehicle is associated with a user profile of a particular user associated with a user profile of an occupant 1010 of the vehicle 1000. In response, the augmented reality display system can generate, on transparent surface 900 of vehicle 1000 through which occupant 1010 can perceive the vehicle 940, a display element 942 which identifies the vehicle 940 as being associated with the particular user. The element 942 can include an avatar icon which is associated with the particular user, thereby providing a recognizable visual indication of an association between the element 940 and the particular user.

In some embodiments, the augmented reality display system generates, on the transparent surface 900, a display element 930 which simulates one or more of the location, dimensions, etc. of a future object in the environment which is under construction, proposed for construction, etc. For example, where a future element includes a structure which is presently under construction, the augmented reality display system include in vehicle 110 can generate an augmented reality display 910, on surface 900, which includes a display element 930 which includes a representation of the outline and location, in the environment, of the future structure.

In some embodiments, display of elements 942, 930 can be selectively implemented based on one or more instances of personal data associated with occupant 1010 which indicate whether to generate display elements 930 indicating future environmental objects, user identification elements 942, some combination thereof, etc.

In some embodiments, an augmented reality display system generates a display element, on a transparent surface, which identifies ("highlights") an element located in the environment, so that an occupant perceiving the object in the environment via the transparent surface perceives that the element is identified by a display element presented on the transparent surface.

In some embodiments, the augmented reality display system generates a display element 960 which identifies an environmental object 950 based on determining, as a result of processing a sensor data representation of an occupant, that the occupant is selecting the particular environmental object in the environment. As shown in FIG. 10, the vehicle 1000 can include one or more internal sensors 1030 which monitor 1032 a portion of an interior of the vehicle 1000 in which an occupant 1010 is located. The augmented reality display system can monitor one or more various body gestures, eye movements, etc. of the occupant 1010 based on processing internal sensor data representations of the occupant 1010 which are generated by the sensors 1030. The system can process the internal sensor data representations, in addition to external sensor data representations generated by one or more external sensors included in the vehicle 1000 and can, based on the processing, determining that the occupant 1010 is selecting a particular environmental object 950 located in the environment 910. Such a determination can include a determination that the occupant 1010 is pointing a limb 1012 in a direction towards the position of the element 950 in the environment, as perceived by the occupant 1010 via the transparent surface 900, a determination that one or more portions of the occupant 1010, including one or more eyes of the occupant 1010, are pointed towards the element 950 in the environment, some combination thereof, etc.

In some embodiments, an augmented reality display system can generate various display elements to enable occupant interaction with one or more portions of the environment. For example, where an environmental object 950 is identified based on a determination that occupant 1010 is selecting the element 950, the augmented reality display system can generate one or more instances of content, including one or more drawings, symbols, instances of text content, etc. which are included in an augmented reality display element indicating the environmental object 950. Such content can be incorporated into a display element representing, identifying, etc. the element 950, based on occupant 1010 interaction with one or more user interfaces included in the vehicle 1010.

In some embodiments, an augmented reality display system can generate various display elements, which are presented on a transparent surface of the vehicle, as part of implementing an entertainment program, game, etc. For example, based on receiving a command, as a result of occupant 1010 interaction with a user interface included in the vehicle 1000, to play an instance of video content, the augmented reality display system can generate display elements which present the video content on a transparent surface 900 which can be perceived by the occupant 1010. In another example, the augmented reality display system can generate various display elements as part of an interactive game, based at least in part upon occupant actions, gestures, interactions with one or more user interfaces, etc.

Based on generating a display element which identifies a particular object in the environment, the augmented reality display system can adjust the display element to follow the object in the environment, present information associated with the identified element, receive occupant commands associated with the identified element, etc.

In some embodiments, an augmented reality display system included in a vehicle enables visual communication between an occupant of the vehicle and a remotely located user, including an occupant of a separate vehicle, via generating an augmented reality display, on a proximate transparent surface of the vehicle, which presents a visual display of the remotely located user, based on sensor data generated by a sensor device monitoring the remotely located user and communicated to the vehicle via one or more communication networks. In some embodiments, where the remotely located user is an occupant of a separate vehicle which also includes a transparent surface and an augmented reality display system, the systems of the separate vehicles can each generate an augmented reality display, on a transparent surface of the respective vehicle, which presents a visual representation, which can include a video stream, of the user occupying the other vehicle.

As shown in FIG. 10, for example, an augmented reality display system can generate, on surface 900, an augmented reality display which comprises a visual representation of a remotely located user 1060, so that occupant 1010 of vehicle 1000 can visually perceive 1014 user 1060 via the surface 900.

Figure 11:
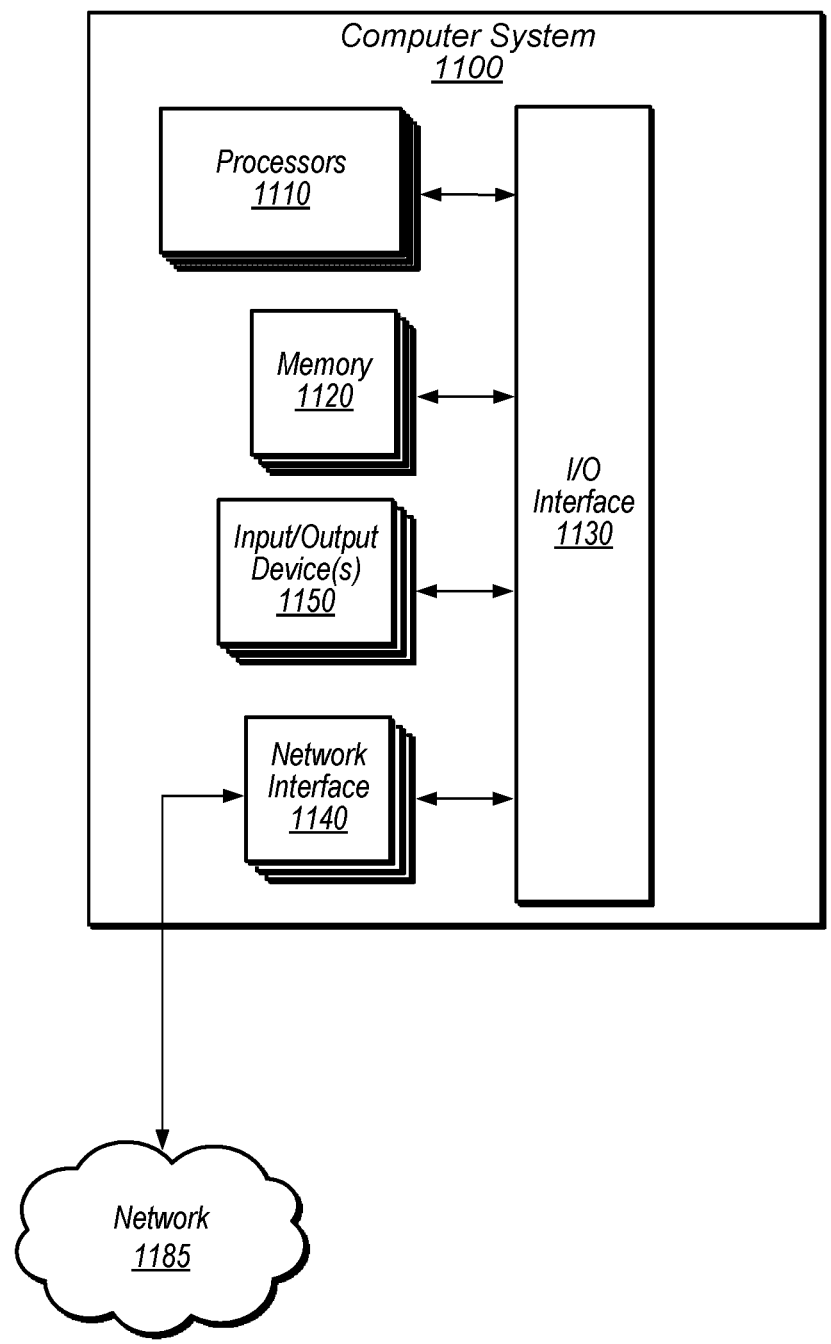
FIG. 11 illustrates an example computer system that may be configured to include or execute any or all of the embodiments described above.

FIG. 11 illustrates an example computer system 1100 that may be configured to include or execute any or all of the embodiments described above. In different embodiments, computer system 1100 may be any of various types of devices, including, but not limited to, a personal computer system, desktop computer, laptop, notebook, tablet, slate, pad, or netbook computer, cell phone, smartphone, PDA, portable media device, mainframe computer system, handheld computer, workstation, network computer, a camera or video camera, a set top box, a mobile device, a consumer device, video game console, handheld video game device, application server, storage device, a television, a video recording device, a peripheral device such as a switch, modem, router, or in general any type of computing or electronic device.

Various embodiments of an augmented reality display system as described herein, may be executed in one or more computer systems 1100, which may interact with various other devices. Note that any component, action, or functionality described above with respect to FIGS. 1 through 11 may be implemented on one or more computers configured as computer system 1100 of FIG. 11, according to various embodiments. In the illustrated embodiment, computer system 1100 includes one or more processors 1110 coupled to a system memory 1120 via an input/output (I/O) interface 1130. Computer system 1100 further includes a network interface 1140 coupled to I/O interface 1130, and one or more input/output devices, which can include one or more user interface (also referred to as "input interface") devices. In some cases, it is contemplated that embodiments may be implemented using a single instance of computer system 1100, while in other embodiments multiple such systems, or multiple nodes making up computer system 1100, may be configured to host different portions or instances of embodiments. For example, in one embodiment some elements may be implemented via one or more nodes of computer system 1100 that are distinct from those nodes implementing other elements.

In various embodiments, computer system 1100 may be a uniprocessor system including one processor 1110, or a multiprocessor system including several processors 1110 (e.g., two, four, eight, or another suitable number). Processors 1110 may be any suitable processor capable of executing instructions. For example, in various embodiments processors 1110 may be general-purpose or embedded processors implementing any of a variety of instruction set architectures (ISAs), such as the x86, PowerPC, SPARC, or MIPS ISAs, or any other suitable ISA. In multiprocessor systems, each of processors 1110 may commonly, but not necessarily, implement the same ISA.

System memory 1120 may be configured to store program instructions, data, etc. accessible by processor 1110. In various embodiments, system memory 1120 may be implemented using any suitable memory technology, such as static random access memory (SRAM), synchronous dynamic RAM (SDRAM), nonvolatile/Flash-type memory, or any other type of memory. In the illustrated embodiment, program instructions included in memory 1120 may be configured to implement some or all of an ANS, incorporating any of the functionality described above. Additionally, existing automotive component control data of memory 1120 may include any of the information or data structures described above. In some embodiments, program instructions and/or data may be received, sent or stored upon different types of computer-accessible media or on similar media separate from system memory 1120 or computer system 1100. While computer system 1100 is described as implementing the functionality of functional blocks of previous Figures, any of the functionality described herein may be implemented via such a computer system.

In one embodiment, I/O interface 1130 may be configured to coordinate I/O traffic between processor 1110, system memory 1120, and any peripheral devices in the device, including network interface 1140 or other peripheral interfaces, such as input/output devices 1150. In some embodiments, I/O interface 1130 may perform any necessary protocol, timing or other data transformations to convert data signals from one component (e.g., system memory 1120) into a format suitable for use by another component (e.g., processor 1110). In some embodiments, I/O interface 1130 may include support for devices attached through various types of peripheral buses, such as a variant of the Peripheral Component Interconnect (PCI) bus standard or the Universal Serial Bus (USB) standard, for example. In some embodiments, the function of I/O interface 1130 may be split into two or more separate components, such as a north bridge and a south bridge, for example. Also, in some embodiments some or all of the functionality of I/O interface 1130, such as an interface to system memory 1120, may be incorporated directly into processor 1110.

Network interface 1140 may be configured to allow data to be exchanged between computer system 1100 and other devices attached to a network 1185 (e.g., carrier or agent devices) or between nodes of computer system 1100. Network 1185 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1140 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices may, in some embodiments, include one or more display terminals, keyboards, keypads, touchpads, scanning devices, voice or optical recognition devices, or any other devices suitable for entering or accessing data by one or more computer systems 1100. Multiple input/output devices may be present in computer system 1100 or may be distributed on various nodes of computer system 1100. In some embodiments, similar input/output devices may be separate from computer system 1100 and may interact with one or more nodes of computer system 1100 through a wired or wireless connection, such as over network interface 1140.

Memory 1120 may include program instructions, which may be processor-executable to implement any element or action described above. In one embodiment, the program instructions may implement the methods described above. In other embodiments, different elements and data may be included. Note that data may include any data or information described above.

Those skilled in the art will appreciate that computer system 1100 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 1100 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1100 may be transmitted to computer system 1100 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. An apparatus, comprising:
    an augmented reality display system of a vehicle, wherein the augmented reality display system comprises one or more processors and a memory, wherein the augmented reality display system is configured to:
        monitor an object located in an environment in which the vehicle is located and which is perceptible through a transparent surface of the vehicle, wherein the object comprises instances of content;
        based on monitoring the object, determine whether respective instances of content are relevant content or unrelated content with respect to a driving route for the vehicle; and
        generate an augmented reality display, on the transparent surface, which comprises a display element which conforms to at least one boundary of at least a portion of the object and at least partially obscures one or more instances of the unrelated content on the object, such that one or more instances of the relevant content on the object are perceptible independently of the one or more instances of the unrelated content via the transparent surface.

2. The apparatus of claim 1, wherein the augmented reality di splay system is configured to:
    include, in the display element, an instance of generated content, based on monitoring the object, such that the instance of generated content replaces the one or more instances of the relevant content as being perceptible, via the transparent surface, on the object.

3. The apparatus of claim 2, wherein:
the instance of generated content comprises at least one instance of content, of the one or more instances of content, which is translated to a different language.

4. The apparatus of claim 1, wherein:
the display element conforms to all boundaries, of at least a portion of the object, which are perceptible via the transparent surface.

5. The apparatus of claim 1, further comprising:
one or more sensors configured to generate sensor data representations of the environment,
wherein the augmented reality display system is further configured to:
monitor the object based at least on the sensor data representations.

6. The apparatus of claim 5, wherein the augmented reality display system is further configured to:
monitor environmental conditions of the environment based at least on the sensor data representations of the environment; and
generate the display element based at least on the environmental conditions.

7. The apparatus of claim 6, wherein the augmented reality display system is further configured to:
determine that the one or more instances of content on the object include a local speed limit;
based on a determination that the environmental conditions includes rain, include, in the display element, an instance of generated content that is based at least on an adjusted value of the local speed limit.

8. The apparatus of claim 1, wherein the augmented reality display system is further configured to:
generate the display element based at least on personal data associated with an occupant of the vehicle.

9. One or more non-transitory, computer-readable storage media storing instructions that, when executed on or across one or more processors, cause the one or more processors to:
monitor an object located in an environment in which a vehicle is located and which is perceptible through a transparent surface of the vehicle, wherein the object comprises instances of content;
determine whether respective instances of content are relevant content or unrelated content with respect to a driving route for the vehicle; and
generate an augmented reality display, on the transparent surface, which comprises a display element which conforms to at least one boundary of at least a portion of the perceived object and at least partially obscures one or more instances of the unrelated content on the object, such that one or more instances of the relevant content on the object are perceptible independently of the one or more instances of the unrelated content via the transparent surface.

10. The one or more non-transitory, computer-readable storage media of claim 9, further comprising instructions that, when executed on or across the one or more processors, cause the one or more processors to:
include, in the display element, an instance of generated content, based on monitoring the object, such that the instance of generated content replaces the one or more instances of the relevant content as being perceptible, via the transparent surface, on the object.

11. The one or more non-transitory, computer-readable storage media of claim 10, wherein:
the instance of generated content comprises at least one instance of content, of the one or more instances of content, which is translated to a different language.

12. The one or more non-transitory, computer-readable storage media of claim 9, wherein:
the display element conforms to all boundaries, of at least a portion of the object, which are perceptible via the transparent surface.

13. The one or more non-transitory, computer-readable storage media of claim 9, further comprising instructions that, when executed on or across the one or more processors, cause the one or more processors to:
monitor environmental conditions of the environment based at least on sensor data representations of the environment generated by one or more sensors of the vehicle; and
generate the display element based at least on the environmental conditions.

14. The one or more non-transitory, computer-readable storage media of claim 13, further comprising instructions that, when executed on or across the one or more processors, cause the one or more processors to:
determine that the one or more instances of content on the object include a local speed limit;
based on a determination that the environmental conditions includes rain, include, in the display element, an instance of generated content that is based at least on an adjusted value of the local speed limit.

15. The one or more non-transitory, computer-readable storage media of claim 9, further comprising instructions that, when executed on or across the one or more processors, cause the one or more processors to:
generate the display element based at least on personal data associated with an occupant of the vehicle.

16. A method, comprising:
monitoring, by an augmented reality display system of a vehicle, an object located in an environment in which the vehicle is located and which is perceptible through a transparent surface of the vehicle, wherein the object comprises instances of content;
determining whether respective instances of content are relevant content or unrelated content with respect to a driving route for the vehicle; and
generating, by the augmented reality display system, an augmented reality display, on the transparent surface, which comprises a display element which conforms to at least one boundary of at least a portion of the object and at least partially obscures one or more instances of the unrelated content on the object, such that one or more instances of the relevant content on the object are perceptible independently of the one or more instances of the unrelated content via the transparent surface.

17. The method of claim 16, further comprising:
including, in the display element, an instance of generated content, based on monitoring the object, such that the instance of generated content replaces the one or more instances of the relevant content as being perceptible, via the transparent surface, on the object.

18. The method of claim 17, wherein:
the instance of generated content comprises at least one instance of content, of the one or more instances of content, which is translated to a different language.

19. The method of claim 16, wherein:
the display element conforms to all boundaries, of at least a portion of the object, which are perceptible via the transparent surface.

20. The method of claim 16, further comprising:
monitoring environmental conditions of the environment based at least on sensor data representations of the environment generated by one or more sensors of the vehicle;
generating the display element based at least on the environmental conditions;
determining that the one or more instances of content on the object include a local speed limit; and
based on a determination that the environmental conditions includes rain, including, in the display element, an instance of generated content that is based at least on an adjusted value of the local speed limit.

21. The method of claim 16, further comprising:
generating the display element based at least on personal data associated with an occupant of the vehicle.

* * * * *